Nov. 15, 1966  T. R. SANTELLI  3,285,461

COMPOSITE RECEPTACLE

Original Filed Sept. 14, 1962

INVENTOR.
T. R. SANTELLI
BY J. F. Teigland
W. A. Schaich
ATTORNEYS

3,285,461
COMPOSITE RECEPTACLE

Thomas R. Santelli, Sylvania, Ohio, assignor to Owens-Illinois Inc., a corporation of Ohio
Continuation of application Ser. No. 223,698, Sept. 14, 1962. This application Apr. 6, 1964, Ser. No. 357,683
4 Claims. (Cl. 220—17)

This application is a continuation of my co-pending application Serial No. 223,698, filed September 14, 1962, and entitled, "Composite Receptacle."

My invention is a composite receptacle comprising a relatively rigid shell and a plastic container secured within the shell and incorporating a mouth portion.

There are some kinds of merchandise which can be packaged safely and satisfactorily only in plastic containers, formed for example of polyethylene and which will detrimentally affect or be detrimentally affected by glass bottles or jars, and perhaps containers formed from other materials.

It is therefore an object of my invention to provide a plastic container utilizing a minimum amount of plastic material, and encase and effectively support this container in a relatively rigid shell which, if desired, may, after dispensing of the packaged commodity be easily separated from the container and used for various purposes. Thus the shell performs a readily recognized twofold function.

A further object of my invention is the provision of a composite receptacle in which the exterior or shell element is a conventional glass tumbler or perhaps a widemouth jar and the container, viz the inner member which directly contacts the commodity packaged, is formed of a plastic material such as polyethylene and wherein the two elements are in intimate contact with each other substantially continuously throughout their length and breadth.

It is likewise an important object of my invention to provide novel, effective air-venting means functioning to allow escape of air from between the two elements incident to either initial assembling thereof or incident to filling of the package with a commodity, such in some instances being the step, which for the first time, distends the container to the form of the shell interior.

Other objects will be in part apparent and in part pointed out hereinafter.

In the accompanying drawings forming a part of my application:

Figure 1:
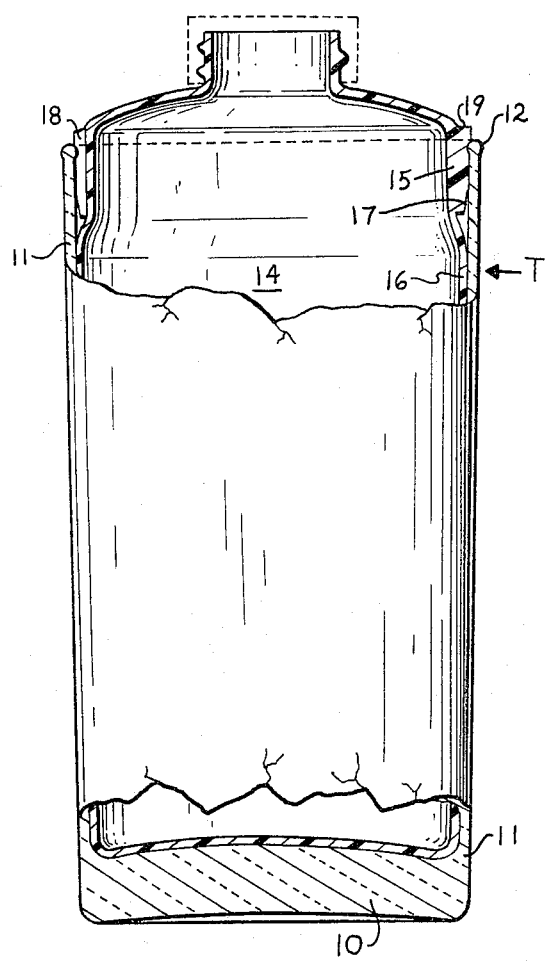
FIG. 1 is a side elevational view, partly in section showing a composite receptacle embodying my invention.
Figure 2:
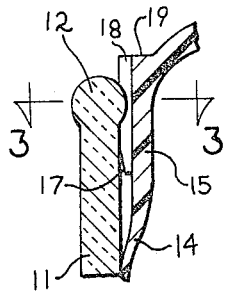
FIG. 2 is a fragmentary enlarged sectional view illustrating holding means for releasably securing the shell and inner container in assembled relationship and additionally showing an air-venting means.
Figure 3:
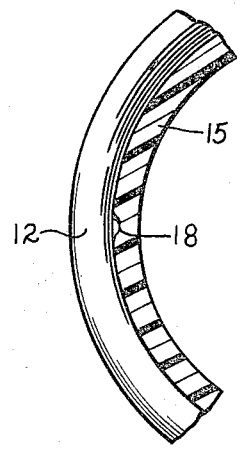
FIG. 3 is a sectional view taken at the line 3—3 of FIG. 2.

In the illustrated embodiment of my invention shown in FIGS. 1–3, the receptacle comprises a shell in the form of a conventional or any preferred form of glass tumbler T, including a bottom 10 and cylinder-like upstanding side wall 11 which may either be tapered or straight and, in either event, terminates in an annular, mouth-defining rim. This rim may be plain or if preferred, formed as a continuous bead 12 which may project either or both inwardly and outwardly radially but, in either event, aids in holding the parts releasably assembled, as will become abundantly clear, presently.

Within this shell, (the tumbler T) is a primary container 14 with which the commodity being packaged has direct contact. This container is formed of a plastic material such for example as polyethylene, or one having like general characteristics. Such container may well be formed through resort to conventional, combined injection molding and tube drawing practice, in accordance with which I form first a collar-like holding element 15 by injecting a measured quantity of the plastic material into a mold (not shown) and then draw, sever and "end seal" an elongated tube 16 or body as an integral part of said element 15. Other methods of and apparatus for producing this inner container may well be utilized.

This container, in the form illustrated, comprises the holding collar 15 or ring, which is of such external diameter to be snugly received within the tumbler mouth so as to be frictionally held therein against accidental displacement. The bead 12 about the rim will press into the collar (FIG. 2) and thus aid materially in holding the elements assembled. The collar may well have a tapered guiding surface 17 which is located exteriorly about its lower margin to facilitate insertion of the collar into the tumbler mouth. An air-vent channel 18 extends transversely of the axial width of the collar, externally thereof, to allow escape of air from the tumbler as the container is placed within the latter. Thus air entrapment between the container and tumbler to any appreciable extent, is avoided.

It is apparent that in that form of my invention shown in FIGS. 1–3, the container 14 is telescoped into the tumbler T and with snug fitting of the collar 15 in the tumbler mouth, these parts will be releasably yet securely held against accidental separation. The main body of the container may be of quite thin wall thickness and capable of collapse for packaging and shipment to the consumer who then assembles such containers and tumblers preparatory to filling and closing. Alternatively, the wall thickness may be adequate to create a semi-rigid structure and in this event the contour and dimensions would be such as to insure substantially continuous contact with the inner surface of the tumbler T. Upon consumption of the package contents, the container 14 may easily be removed and the tumbler used in conventional fashion. The annular shoulder 19 provides means facilitating pressing the collar into place.

Figure 4:
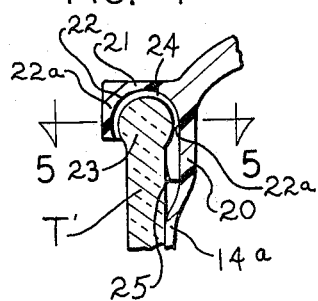
FIG. 4 is a view like FIG. 2 showing another form of holding means and air-vent.
Figure 5:
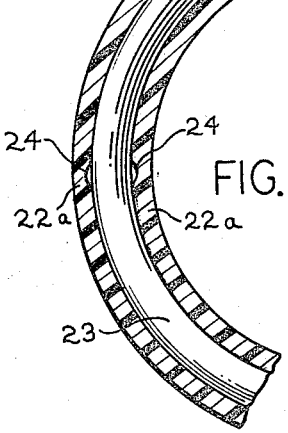
FIG. 5 is a sectional view taken at the line 5—5 of FIG. 4.

In FIGS. 4 and 5, I have shown the holding collar 20 for the container 14a provided with an annular radial flange 21 the underside of which is formed with a circumferential channel 22 to receive the bead 23 on the tumbler rim. This channel 22 is so formed that its side walls create jaws 22a yielding gripping the bead 23 between them. An air-vent in the form of a transverse channel 24 in the channel wall extends over the bead 23, performing the identical function of the vent 18 above described. Here again, the collar has a tapered guiding surface 25 to aid one in assembling the tumbler T and container.

Modifications may be resorted to within the scope of the appended claims.

I claim:

1. A package containing a commodity and comprising a rigid external shell having a bottom and a cylinder-like body rising and flaring from said bottom to a relatively wide mouth, an annular internal bead at the mouth end of the package, an initially collapsed thin-wall bag-like inner container formed of a thermoplastic material, said container distended into intimate contact with the shell by the packaged commodity and a relatively thick collar-like element forming an integral part of the container for releasable holding engagement with said bead, said element having a vent-channel for the escape of air from within the shell concurrently with distension of the bag-like container.

2. A composite receptacle comprising an external relatively rigid shell having a bottom and a continuous upstanding side-wall having at its upper end a mouth of about the same diameter as the shell proper, a thin-wall thermoplastic container within said shell and at least in part in intimate contact with the interior surface of the shell and means releasably securing the shell and container assembled comprising an annular internal bead at the mouth of the shell and a thickened collar-like portion on the container in which the bead is at least in part embedded.

3. A receptacle as defined in claim 2 further including an air vent channel formed between said mouth and said collar-like portion.

4. A composite receptacle comprising an external relatively rigid shell having a bottom and a continuous upstanding sidewall terminating at its upper end in an annular rim, a thin wall thermoplastic container within said shell and at least in part in intimate contact with the interior surface of the shell and means contacting the exterior surface of said shell for securing the container to the shell.

References Cited by the Examiner

UNITED STATES PATENTS

| | | | |
|---|---|---|---|
| 2,859,085 | 11/1958 | Morrison | 215—12 |
| 2,941,689 | 6/1960 | Black | 220—63 |
| 3,028,039 | 4/1962 | Clark | 220—44 |

THERON E. CONDON, *Primary Examiner.*

G. T. HALL, *Assistant Examiner.*